Feb. 15, 1955    J. J. FREEDLAND    2,702,032
MOUTHPIECE
Filed Aug. 19, 1953
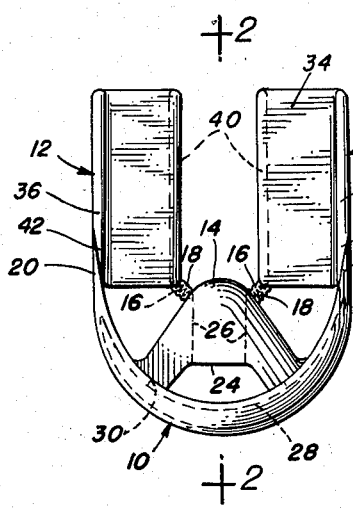
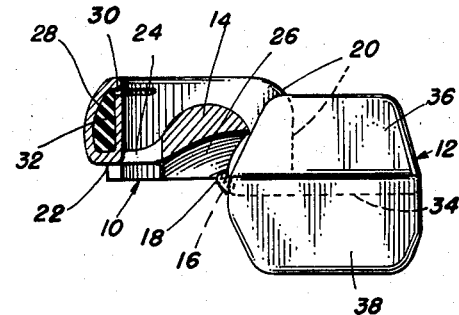
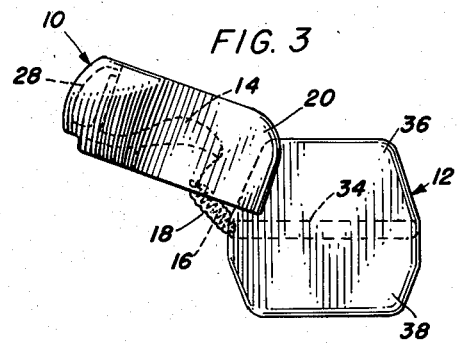
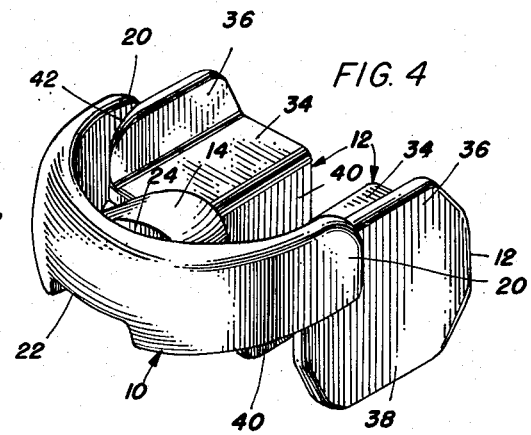
INVENTOR:
JACK J. FREEDLAND
BY
ATT'YS

United States Patent Office 2,702,032
Patented Feb. 15, 1955

2,702,032

MOUTHPIECE

Jack J. Freedland, Laguna Beach, Calif.

Application August 19, 1953, Serial No. 375,310

10 Claims. (Cl. 128—136)

(Granted under Title 35, U. S. Code (1952), sec. 266)

This invention relates in general to a mouthpiece and is more particularly described as a mouthpiece for athletes although it may have a more general use as a shock therapy mouth guard and protects the front lips as well as the teeth and cheeks.

The ordinary mouthpiece is usually engaged only by the front teeth of a wearer, or it is somewhat in the shape of a U with teeth-engaging portions at the upper and lower sides thereof. With these constructions, a number of different sizes are required; there is no adjustment for mouths and teeth of different sizes and shapes; and no provision is made for a flexible conformation of the guard to the interior of the mouth. In this invention the guard is made in three sections, a front labial portion which protects the upper lip with a projection for occluding the tongue and two lateral wings which protect the rear teeth, the cheeks, and establish maximum retention of the mouthpiece for mouths of different sizes.

An important object of the invention is therefore to provide a mouthpiece having three connected sections freely movable with respect to each other.

A further object of the invention is to provide a mouthpiece which has a front or labial section containing a soft protecting filler.

A further object of the invention is to provide a front section with side wings which are resiliently connected to the front portion to permit free adjustment thereof.

A still further object of the invention is to provide a three-piece mouth guard with a front piece and two side extensions connected thereto and overlapped at the sides by projections from the front sections.

A still further object of the invention is to provide a front lip-protecting section having a rear extension which gives the tongue protection and also has an opening at the front to allow for breathing when the mouth guard is engaged by the teeth.

Other objects of the invention will appear in the specification and will be apparent from the accompanying drawing, in which Fig. 1 is a top plan view of a mouthpiece in accordance with this invention;

Fig. 2 is a sectional view taken on the line 2—2 of Fig. 1;

Fig. 3 is a side view showing the lateral wings at an angle to the front piece; and Fig. 4 is a perspective view of the construction as shown in Fig. 1.

An ordinary mouthpiece is not satisfactory for use by athletes and particularly by prize fighters. Among the reasons for this are that it is easily knocked from the mouth during a fight; it interferes with breathing; it fails to protect the front lip; and it does not properly protect the teeth and jaws.

The present mouthpiece is made of soft rubber or other suitable plastic; it is tough, light in weight, and durable. It protects the upper lip, the upper and lower teeth, the tongue, cheeks, and gums; and it allows breathing through the teeth without removing the mouthpiece.

Referring now more particularly to the drawings, this mouthpiece is composed of three parts, a front piece 10 and two similar side pieces 12 to be engaged between the teeth at the front and at each side of the mouth. The side pieces 12 are somewhat rectangular, and the forward inner portion of each side piece is connected at opposite sides by means of a central rear lingual extension 14 from the front piece 10 by resilient means such as small coil springs 16, the ends of which are imbedded at one end in the side pieces 12 and in the sides of the extension 14. The exposed portion of each spring 16 has a cover 18 of rubber or other similar protective material to improve sterilization. These springs allow movement in all directions, thus making it possible for the mouthpiece or guard to be worn by any person regardless of dentition, size, or shape.

The front piece is curved rearwardly at the side edges and provided with tapered wings 20 which overlap the forward edges of the side pieces 12. If desired, these wings may be attached to the side pieces by connecting them thereto with rubber cement after any particular mouthpiece has been fitted to an individual's mouth thereby adding rigidity to the guard for that person.

The front piece 10 is connected to the side pieces 12 by the resilient springs 16 in such a manner that in the raised position of the guard, as shown in Fig. 3, the front piece is inclined upwardly relative to the side pieces. When the mouthpiece is placed into the oral cavity, the front lip extension is thus pressed against the edge of the front upper teeth, thus tending to maintain the mouthpiece in position.

At the lower edge of the front piece is a cutout recess 22 which extends partially into and through the lingual extension 14 by means of an opening 24 therethrough so that a free path is provided through and between the teeth, when the guard is in position, for the passage of air for breathing. The under portion of the lingual extension may also be provided with a central undercut 26 so that air will pass freely between the teeth and into the mouth, and water or other liquid may also pass freely into and out of the mouth without removing the mouthpiece. In the front piece is a cavity or recess 28 which extends across the front and tapers into the wings 20 at the sides thereof having a narrow slot 30 at the upper edge on the inside for at least a portion of the extent of the recess to provide access for the insertion and removal of a soft resilient pad 32, which conforms in shape to the recess, of sponge, rubber, or other similar material, thus providing a smooth tissue-tolerant padding for the inside mouth surfaces producing the labial and buccal surfaces as well as the lips and cheeks.

Each of the side pieces 12 has a central occlusal pad 34 engaged by the upper and lower teeth which serves as a shock absorber between the jaws. At the outer side are upper and lower buccal extensions 36 and 38 to protect the cheeks at the corresponding sides of the teeth. At the inner side of the pad 34 is a downward lingual extension 40 which is at the inside of the teeth, when the guard is in position, to separate the teeth from the tongue. These extensions are smooth and soft but readily maintain the side pieces in place between the upper and lower jaws and protect the cheeks at the outer sides of the guard.

In using this guard or mouthpiece, it is simply inserted into the mouth, the side pieces are adjusted over the rear teeth at both sides thereof, and the front piece is engaged between the front teeth with the lip portion interposed between the upper teeth and the upper lip. The side wings 20 are tapered and the adjacent front edges of the extensions 36 may have correspondingly beveled edge 42 which fits smoothly with the tapered edges of the wings 20 so that an individual can shorten or adjust these portions and may even cement them together so that the guard will fit the mouth more comfortably. With this construction, occlusal pads are provided between all of the front and side teeth; the front upper lip is resiliently padded; and the cheeks at the side of the teeth are protected by the cheek extensions.

While a preferred embodiment has been described in some detail, it should be regarded as an example or embodiment of the invention and not as a restriction or limitation therein as many changes may be made in the construction and arrangement of the parts without departing from the spirit and scope of the invention.

The invention described herein may be manufactured and used by or for the Government of the United States of America for governmental purpose without payment of any royalties thereon and therefor.

I claim:

1. A three-section mouthpiece comprising a front piece to engage between the front teeth with a central rearward tongue-occluding extension, a pair of lateral guards engaged by the rear teeth, and flexible resilient connections between the lateral guards and between opposite rearward sides of the tongue extension.

2. A mouthpiece in accordance with claim 1 in which the front piece is rounded to fit the front of the mouth with laterally projecting side wings to overlap and engage the front side portions of the said lateral guards.

3. In a mouthpiece in accordance with claim 1, the tongue extension extending upwardly from the base of the front piece and having an opening through the front portion of the tongue extension, and the front lower edge of the front piece having a recess communicating with the opening through the tongue extension to provide an air passage in the mouthpiece.

4. In a mouthpiece in accordance with claim 1, the lateral guards each having a pad for engagement between the upper and lower teeth and buccal extensions above and below the pad, and a downward extension from the pad at the inner side thereof to set each lateral guard firmly upon the lower teeth at the corresponding side of the mouth, the lower projections at the inside and outside of each guard being of substantially the same downward extent.

5. In a mouthpiece in accordance with claim 4, the front outer edges of the buccal extensions being slightly beveled, and the front piece having side wings overlapping the buccal extensions and the ends of the wings being tapered to conform to the beveled ends of the extension whereby these corresponding overlapping edges may be connected together for individually fitting the mouthpiece and adding rigidity to it as a guard.

6. In a mouthpiece in accordance with claim 1 in which the front piece is connected to the lateral guards by resilient spring members imbedded at their ends in the members which they connect and to permit free adjusting movement of each of the lateral guards individually with respect to the front piece.

7. A mouthpiece in accordance with claim 6 in which the springs connecting the mouthpiece and the lateral guards are metal coil springs, and a rubber coating for the springs to make them more sterile.

8. A mouthpiece in accordance with claim 6 in which the springs connecting the front piece to the lateral guards tend to incline the front piece upwardly relative to the guards to urge the front piece upwardly at the front of the mouth when the lateral guards are at the rear of the mouth.

9. In a mouthpiece for athletes, a front piece curved to fit the front of the mouth having a recessed portion and adapted to fit between the front teeth and the front upper lip, the recess having a slot at its upper end, and a soft resilient pad in the front piece and insertable in the recess through the said slot.

10. In a mouthpiece in accordance with claim 9, the curved portion of the mouthpiece having tapered sides graduating in thickness and the recess within the curved portion of the mouthpiece being correspondingly curved and tapered at the ends thereof and the resilient pad being inserted and removed through a slot less in length than the full length of the recess.

No references cited.